United States Patent [19]

Schmidt

[11] 4,214,302
[45] Jul. 22, 1980

[54] EIGHT BIT STANDARD CONNECTOR BUS FOR SIXTEEN BIT MICROCOMPUTER

[75] Inventor: Robert W. Schmidt, Stafford, Tex.

[73] Assignee: Texas Instruments Incorporated, Dallas, Tex.

[21] Appl. No.: 898,736

[22] Filed: Apr. 24, 1978

[51] Int. Cl.² ............................................. G06F 13/00
[52] U.S. Cl. ..................................... 364/200; 365/63
[58] Field of Search ... 364/200 MS File, 900 MS File; 365/230, 63, 191, 220, 221

[56] References Cited

U.S. PATENT DOCUMENTS

| 3,938,098 | 2/1976 | Garlic | 364/200 |
|---|---|---|---|
| 4,016,546 | 4/1977 | Bennett et al. | 364/200 |
| 4,057,846 | 11/1977 | Cockerill et al. | 364/200 |

OTHER PUBLICATIONS

Walker, "Comments on the S-100 Bus Extension", Byte Publications 1/79.

Morrow et al., "Proposed Standard for the S-100 Bus" NCC 1978, Personal Computing Digest, 5/78, p. 305.
Notari, "A 16 Bit System for the S-100 Bus that Holds its Own Against a Mini", Interface Age, 7/77, pp. 72, 73.

Primary Examiner—Mark E. Nusbaum
Attorney, Agent, or Firm—John G. Graham

[57] ABSTRACT

A microcomputer system uses a standardized S-100 bus with eight bit Data In and eight bit Data Out lines, but has a sixteen bit microprocessor with sixteen bit bidirectional data input/output terminals. An arrangement is provided to cross-connect the Data In lines and Data Out lines for one memory board compared to another, these two memory boards being accessed by the same address. A processor board containing the microprocessor connects the Data In and Data Out lines to the data input/output terminals by controllable unidirectional buffers which criss-cross the bytes on write compared to read operations.

6 Claims, 1 Drawing Figure

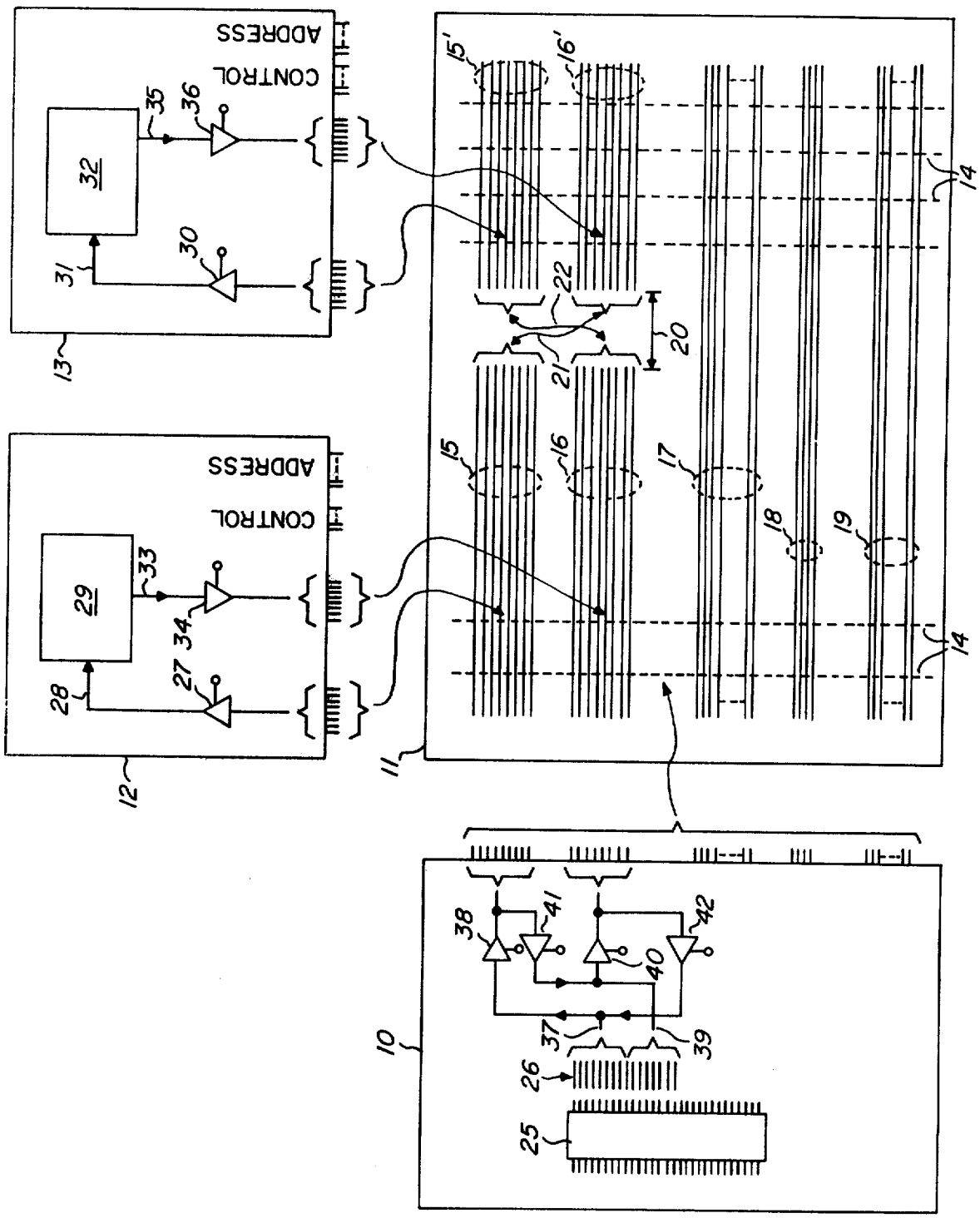

EIGHT BIT STANDARD CONNECTOR BUS FOR SIXTEEN BIT MICROCOMPUTER

RELATED CASE:

The subject matter of this application is related to that of my copending application Ser. No. 898,735, filed herewith and assigned to Texas Instruments.

BACKGROUND OF THE INVENTION

This invention relates to microcomputer systems, and more particularly to the use of a sixteen bit microcomputer with standard eight bit bus arrangement and memory boards.

One of the most favorable factors in the development of the home or personal computer industry is de facto standardization of the bus arrangement used to connect one printed circuit board to another. This standard which is fairly widely accepted, is the "Altair" or "S-100" bus used in the original home computer kit, the Altair 8800. The S-100 bus contains one hundred conductors, many of which are not used or not assigned at present. Certain pins or conductors are designated for power supplies, clocks and ground, others for various interrupts and controls such as WAIT, INTERRUPT ACKNOWLEDGE, MEMORY WRITE, HOLD, etc. Sixteen pins are designated for the memory address, allowing 64K bytes of memory to be directly accessed. Separate unidirectional eight bit data pins are provided, eight Data In pins and eight Data Out pins. This bus system was built for the 8080 eight bit microprocessor, which is the most widely used at present, but it can be used with other eight bit microprocessor parts. Several manufacturers of microcomputers use the S-100 bus, and dozens of manufacturers of microcomputer boards use the S-100 to make hundreds of standard parts such as various types of memory boards as well as processor boards.

The Proceedings of the IEEE, February 1978, p. 117, in an article entitled "Low-Cost Microcomputing: The Personal Computer and Single-Board Revolutions", states:

"The Altair 8800 and S100 Bus: The original MITS Altair 8800 kit . . . featured . . . 8080 central processing unit (CPU) . . . and a 100 line bus (known at the Altair or 'S100" bus). The bus allows expansion memory and peripherals to be connected. Expansion kits included additional memory, real-time clock, and vectored interrupt cards".

"The 100-line Altair bus has been widely copied. The bus data width is 8 bits, with separate lines for input and output. 65,536 bytes of memory may be addressed. Fourteen lines remain unused, and extensions have been proposed . . . Dozens of manufacturers offer Altair plug-compatible modules including READ-WRITE RAM, READ-ONLY memory (ROM) and combination RAM/ROM cards. Compatible EPROM programmers are available for the ultraviolet-Erasable, reProgrammable Read Only Memories (EPROM's) used for nonvolatile storage. S100 interface cards will drive black-and-white video displays, color video displays, magnetic cassette tape controllers, real-time clocks, and parallel and serial digital input/output (I/O). There are Altair-compatible controllers for flexible disks such as the mini-floppy (approximately 64K bytes), standard floppy (256K bytes), and even for Calcomp Trident hard disks (80,000K bytes). Besides digital-to-analog and analog-to-digital converters, there are S100-compatible speech and music synthesizers, modems for communication via telephones, video camera controllers, and kits for experimenting with speech recognition."

Sixteen bit microprocessors employ a sixteen bit bidirectional data bus which obviously is not directly compatible with the two eight bit unidirectional data bus sets in the S-100. A sixteen bit procesor of course uses a sixteen bit instruction word which is of many times more capability than an eight bit instruction word. Arithmetic operations can be performed in sixteen bit machines in from one third to one tenth the instruction words needed in eight bit machines. The cost of generating software is directly related to the number of statements or lines of code needed, so if the number of statements needed is halved, the cost is likewise halved. Further, sixteen bit processors often contain additional features such as more flexible addressing modes and more interrupt capability. The TMS9900 sixteen bit processor manufactured by the assignee hereof, Texas Instruments, has the added features of hardware multiply and divide instructions, multiple sets of sixteen general purpose registers and context switching which allows rapid interrupt response and user extension of the hardware instruction set. And so, many designers seek to employ sixteen bit procesors in place of the older but widely accepted eight bit processors.

Various interconnect arrangements have been proposed for interfacing a sixteen bit processor with the eight bit S-100 bus. Certainly, additional ones of the unused pins could be employed, producing two sixteen bit unidirectional buses. This would not be desirable because the system would not be compatible with the many available memory boards now on the market, and further a user could not use any of his existing boards if he wished to upgrade to a sixteen bit system. Compatibility can be achieved by forcing the sixteen bit processor to handle data input/output to the memory boards in eight bit bytes instead of sixteen bit words, but this sacrifices much of the advantage of using a sixteen bit processor in the first place, since each memory access is twice as long. See Journal of West Coast Computer Faire, March 1978, p. 394-401, 2nd BYTE magazine, March 1978, p. 148.

It is the principal object of this invention to provide a microcomputer system wherein the board-to-board connectors employ a standardized bus which has a word length of fewer bits than that of the data bus of the processor chip.

Another object is to provide an interconnection arrangement wherein a sixteen bit microprocessor can be used with existing eight bit memory boards having a standardized bus, particularly without sacrificing the speed inherent in a more powerful processor.

SUMMARY OF THE INVENTION

A microcomputer system uses a standardized S-100 bus with eight-bit Data In and eight-bit Data Out lines, but has a sixteen bit microprocessor with sixteen bit bidirectional data input terminals. An arrangement is provided to cross-connect the Data In lines and Data Out lines for one memory board compared to another, these two memory boards being accessed by the same address. A processor board containing the microprocessor connects the Data In and Data Out lines to the data input/output terminals by controllable unidirectional buffers which criss-cross the bytes on write compared to read operations. The cross connect arrangement includes cutting the Data In and Data Out lines on the connector board and coupling the Data In lines on one side of the cut to Data Out lines on the other side, and vice versa, using jumper wires.

BRIEF DESCRIPTION OF THE DRAWING

The novel features believed characteristic of the invention are set forth in the appended claims. The invention itself, however, as well as other features and advantages thereof, will be best understood by reference to the detailed description which follows, read in conjunction with the accompanying drawing, wherein:

The single FIGURE is an electrical diagram represented in block form showing a microcomputer system according to the invention.

DETAILED DESCRIPTION OF SPECIFIC EMBODIMENT

In a normal S-100 bus system operating with an 8080 processor, the data bus is two 8-bit unidirectional buses, Data In and Data Out. During a Write cycle eight bits of data are sent out from the processor on the Data Out lines, and the data is written into the appropriate eight memory cells at the byte selected by the address bus. When a Read cycle is performed the data is sent out from the memory board to the processor on the Data In bus. So, during any given Read or Write cycle only one bus is used, either Data In or Data Out, with eight lines being wasted. A single eight-bit bidirectional bus could have been used, since only one set of tristate devices is ever active on the bus at any one time. Data is written to the memory on one set of lines, and read back from memory on a different set of lines.

Referring now to FIG. 1, a modification of an S-100 bus system is illustrated to make use of the fact that the Data In or Data Out buses are not ever in use at the same time. The system includes a processor board 10, an S-100 motherboard or connector board 11, and standard memory boards 12 and 13. The motherboard 11 is a printed circuit board with one hundred conductor lines or traces running parallel along its length, with a number of slots or connectors 14 into which are plugged the pins of the various boards such as the processor and memory boards, using conventional edge connectors. A typical size for small microcomputers is twelve of the slots 14. The traces include an eight bit Data Out bus 15 and an eight bit Data In bus 16, along with an address bus 17, power supply and clock lines 18, and a large number of control lines 19 and other lines not pertinent to this invention. To provide sixteen bit operation, the printed circuit traces on the bus motherboard are cut at a loction 20, about two-thirds of the distance across the board, i.e., with eight slots to the left and four to the right on a twelve slot board. The circuit traces for the address lines 17, power supplies 18 and other lines are not cut but instead remain the same as in a standard S-100 system. A set of jumpers 21 connects the Data Out bus 15 to the Data In lines 16', i.e., what was right-hand side of the Data In lines 16. A set of jumpers 22 connect the Data In lines 16 to Data Out lines 15', i.e., what were the Data Out lines on the right-hand side of the cut 20. This effectively puts a half-twist or criss-cross in the data lines of the motherboard. The two-thirds to the left of the slot 20 may be referred to as the High byte slots and the one-third to the right as the Low byte slots. A standard memory card 12 is plugged into a slot 14 on the left, and another standard memory card 13 is plugged into a slot 14 on the right. The cards 12 and 13 are set to select for the same address space. This modification of the motherboard by cutting and connecting criss-cross jumpers is all that is required to use S-100 boards in a sixteen bit system.

In operation, if the CPU chip 25 puts a write command on the bus, and drives 16 bits of data onto the data buses 15 and 16 via the sixteen bidirectional data output pins 26 on the chip and appropriate pins on the board 10, then each of the memory cards 12 and 13 will store one of the bytes of data. Unidirectional buffers 27 in each of the eight Data In lines on the memory card 12 will allow the data on the lines 15 to be applied to the "D" inputs 28 of the memory chips in an array 29 of memory devices on the board 12. Likewise, unidirectional buffers 30 on the memory board 13 allow the data from lines 16, as transposed via lines 22 to the lines 15' on the right of the cut 20 to be applied to the data input lines 31 in the array 32 of memory chips. The unidirectional buffers 27 and 30 would be actuated to allow data on the bus 15 and bus 15' to be applied to the inputs 28 and 31 only when a WRITE command is applied to the control lines 19 of the bus, along with board select or chip select when a large number of pairs of memory boards or chips is used. For a Read operation, the output 33 of the array 27 on the board 12 is connected by eight unidirectional buffers 34 to the Data In lines 16, while the output 35 from the memory array 32 is connected by eight unidirectional buffers 36 to the Data In lines 16'. The sets of unidirectional buffers 34 and 36 are controlled by a READ command on control lines 19, as well as board or chip select. Thus, if the CPU 25 puts a WRITE command on the control lines 19 and drives sixteen bits of data onto the bus lines 15 and 16, each of the memories 29 and 32 will store one of the bytes of data. But when a READ cycle is performed by putting a READ command on the lines 19 and activating unidirectional buffers 34 and 36, the data will return on the opposite bus lines. This byte swap could be reconciled by the CPU, by appropriate programming, but it can be eliminated so that the operation of the system will be faster. The unidirectional buffers ordinarily used on the processor card are wired slightly differently to eliminate the byte swap. For WRITE, high order byte is connected by eight lines 37 and eight controllable unidirectional buffers 38 to the pins going to the lines 15, and likewise the low order byte is connected by eight lines 39 and eight controllable unidirectional buffers 40 to pins going to the bus lines 16. For READ, the pins for the bus 15 are connected by eight unidirectional buffers 41 to the lines 39, rather than the lines 37 as in conventional sixteen bit processor boards. Likewise, the pins for the bus 16 are connected by eight unidirectional buffers 42 to the lines 37. This transpostion or criss-cross eliminates the byte swap. The unidirectional buffers 38, 40, 41 and 42 are controlled by WRITE and READ commands from the CPU 25 in a conventional manner.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A microcomputer comprising: a processor board containing a microprocessor having sixteen-bit bidirectional data terminals; at least two memory boards each containing separate eight-bit unidirectional Data In and Data Out lines, each memory board containing a memory array and coupling means connecting the array to the Data In lines and to the Data Out lines to transfer data to and from the array; a connector board containing a standardized bus with a plurality of plug-in connectors to receive the processor board and memory boards, the connector board having separate eight-bit Data In and Data Out lines for connection to said lines on the memory boards; means to cross-connect the data to and from the eight-bit Data In and Data Out lines for one of the memory boards but not the other; and connecting means on the processor board to connect the sixteen-bit bidirectional data terminals to the two separate eight-bit Data In and Data Out lines of the connector board, said microprocessor including means for simultaneously transmitting or simultaneously receiving sixteen bits to or from said memory arrays by utilizing said Data In and Data Out lines as a sixteen-bit bidirectional bus.

2. A microcomputer according to claim 1 wherein the means to cross-connect comprises jumper conductors on the connector board which connect the eight-bit Data In lines one one side of an open circuit in the eight-bit Data In and Data Out lines to the eight-bit Data Out lines on the other side of the open circuit, and like jumper conductors on the connector board which connect the eight-bit Data Out lines on said one side of the open circuit to the eight-bit Data In lines on the other side of the open circuit.

3. A microcomputer according to claim 2 wherein one of the memory boards is connected to a plug in connector on said one side of the open circuit and another of the memory boards is connected to a plug in connector on the other side of the open circuit.

4. A microcomputer according to claim 3 wherein the Data In and Data Out lines on said connector board are coupled by the connecting means on the processor board to the sixteen-bit bidirectional data terminals via controllable unidirectional buffers which cross-connect the Data In and Data Out connections for read and write operations.

5. A method of using a 2N bit microprocessor with a standardized connector board having an N bit data in bus and an N bit data out bus, where N is an integral power of two, comprising the steps of: forming an open circuit gap in the data in bus and data out bus on said connector board; cross-connecting the data in in bus on one side of the gap with the data out bus on the other side of the gap, cross-connecting the data out bus on said one side of the gap with the data in bus on the other side of the gap, and connecting Data In lines and Data Out lines of one memory board to the connector board on said one side of the gap and connecting Data In lines and Data Out lines of another memory board to the connector board on the other side of the gap, and connecting a 2N bit microprocessor on a processor board to the connector board with the 2N bidirectional data lines of the microprocessor being connected to the N bit Data In lines and N bit data out lines by unidirectional controllable cross-connected buffers, said microprocessor simultaneously transmitting or simultaneously receiving 2N bits to or from said memory arrays by utilizing said Data In and Data Out lines as a 2N bit bidirectional bus.

6. A method according to claim 5 wherein N is eight and the standardized connector board uses the S-100 bus convention.

* * * * *